US008756685B2

(12) United States Patent
Jeong et al.

(10) Patent No.: US 8,756,685 B2
(45) Date of Patent: Jun. 17, 2014

(54) DETECTION SYSTEM AND METHOD OF SUSPICIOUS MALICIOUS WEBSITE USING ANALYSIS OF JAVASCRIPT OBFUSCATION STRENGTH

(75) Inventors: Hyun-Cheol Jeong, Seoul (KR); Seung-Goo Ji, Seoul (KR); Tai Jin Lee, Seoul (KR); Jong-Il Jeong, Seoul (KR); Hong-Koo Kang, Seoul (KR); Byung-Ik Kim, Seoul (KR)

(73) Assignee: Korea Internet & Security Agency (KR)

( * ) Notice: Subject to any disclaimer, the term of this patent is extended or adjusted under 35 U.S.C. 154(b) by 483 days.

(21) Appl. No.: 13/282,911

(22) Filed: Oct. 27, 2011

(65) Prior Publication Data

US 2012/0159621 A1 Jun. 21, 2012

(30) Foreign Application Priority Data

Dec. 21, 2010 (KR) ........................ 10-2010-0131398

(51) Int. Cl.
*G06F 21/00* (2013.01)
*G06F 21/51* (2013.01)

(52) U.S. Cl.
CPC ..................................... *G06F 21/51* (2013.01)
USPC .......................................................... 726/22

(58) Field of Classification Search
CPC ..................................................... G06F 21/51
USPC .......................................................... 726/22
See application file for complete search history.

(56) References Cited

U.S. PATENT DOCUMENTS

| 7,562,304 B2* | 7/2009 | Dixon et al. .................. 715/738 |
| 7,765,481 B2* | 7/2010 | Dixon et al. .................. 715/738 |
| 7,822,620 B2* | 10/2010 | Dixon et al. .................. 705/1.1 |
| 8,296,664 B2* | 10/2012 | Dixon et al. .................. 715/760 |
| 8,321,791 B2* | 11/2012 | Dixon et al. .................. 715/738 |
| 8,429,545 B2* | 4/2013 | Dixon et al. .................. 715/760 |
| 8,438,499 B2* | 5/2013 | Dixon et al. .................. 715/809 |
| 8,516,590 B1* | 8/2013 | Ranadive et al. ............... 726/24 |
| 8,555,391 B1* | 10/2013 | Demir et al. .................... 726/24 |
| 8,566,726 B2* | 10/2013 | Dixon et al. .................. 715/738 |
| 8,683,584 B1* | 3/2014 | Daswani et al. ................ 726/22 |
| 2006/0253458 A1* | 11/2006 | Dixon et al. .................. 707/10 |
| 2006/0253578 A1* | 11/2006 | Dixon et al. .................. 709/225 |
| 2006/0253579 A1* | 11/2006 | Dixon et al. .................. 709/225 |

(Continued)

OTHER PUBLICATIONS

Likarish et al.; Obfuscated malicious javascript detection using classification techniques; Malicious and Unwanted Software (MALWARE), 2009 4th International Conference on; Date of Conference: Oct. 13-14, 2009; pp. 47-54; IEEE Xplore.*

(Continued)

*Primary Examiner* — Bradley Holder
(74) *Attorney, Agent, or Firm* — Cantor Colburn LLP

(57) ABSTRACT

A detection system of a suspicious malicious website using the analysis of a JavaScript obfuscation strength, which includes: an entropy measuring processor of measuring an entropy of an obfuscated JavaScript present in the website, a special character entropy, and a variable/function name entropy; a frequency measuring processor of measuring a specific function frequency, an encoding mark frequency and a % symbol frequency of the JavaScript; a density measuring processor of measuring the maximum length of a single character string of the JavaScript; and a malicious website confirming processor of determining whether the relevant website is malicious by comparing an obfuscation strength value, measured by the entropy measuring processor, the frequency measuring processor and the density measuring processor, with a threshold value.

8 Claims, 9 Drawing Sheets

(56) References Cited

U.S. PATENT DOCUMENTS

| | | | |
|---|---|---|---|
| 2006/0253580 A1* | 11/2006 | Dixon et al. | 709/225 |
| 2006/0253581 A1* | 11/2006 | Dixon et al. | 709/225 |
| 2006/0253582 A1* | 11/2006 | Dixon et al. | 709/225 |
| 2006/0253583 A1* | 11/2006 | Dixon et al. | 709/225 |
| 2006/0253584 A1* | 11/2006 | Dixon et al. | 709/225 |
| 2008/0109473 A1* | 5/2008 | Dixon et al. | 707/102 |
| 2008/0114709 A1* | 5/2008 | Dixon et al. | 706/13 |
| 2010/0042931 A1* | 2/2010 | Dixon et al. | 715/738 |
| 2011/0030060 A1* | 2/2011 | Kejriwal | 726/25 |
| 2011/0239300 A1* | 9/2011 | Klein et al. | 726/23 |
| 2011/0289582 A1* | 11/2011 | Kejriwal et al. | 726/22 |
| 2012/0174225 A1* | 7/2012 | Shyamsunder et al. | 726/24 |

OTHER PUBLICATIONS

Likarish et al.; Targeted web crawling for building malicious javascript collection; DSMM '09 Proceedings of the ACM first international workshop on Data-intensive software management and mining; 2009; pp. 23-26; ACM Digital Library.*

* cited by examiner

DETECTION SYSTEM AND METHOD OF SUSPICIOUS MALICIOUS WEBSITE USING ANALYSIS OF JAVASCRIPT OBFUSCATION STRENGTH

Pursuant to 35 U.S.C. §119(a), this application claims the benefit of Korean Application No. 10-2010-131398, filed on Dec. 21, 2010, the contents of which is hereby incorporated by reference herein in its entirety.

TECHNICAL FIELD

The present invention relates to a detection system and method of a suspicious malicious website using the analysis of a JavaScript obfuscation strength, and, more particularly, to a detection system and method of a suspicious malicious website using the analysis of a JavaScript obfuscation strength which measure an obfuscation strength of an obfuscated website using a density, a specific function frequency, a special character frequency, and an entropy value, based on the length of an obfuscated JavaScript character string present in the website.

BACKGROUND ART

Recently, the outflow of personal information and the attack to the society using the internet has been increasing. Widely-used methods include inserting an attack code into a website or making an attacking program downloaded to users' computers through the internet. Such attacks are easily done using the JavaScript used in the website. In addition, a JavaScript obfuscation technique is used to hide a JavaScript containing such an attack code. A variety of methods have been adopted to avoid the attacks based on the internet website.

There is a dynamic analysis system which detects the presence or absence of a malicious action of a malicious website by directly visiting the website and analyzing the result. This dynamic analysis system is susceptible to attacks because it visits the website and analyzes the result, spends a long time visiting the website and analyzing the result, and has a problem of setting up a system environment which can be attacked. There is also a static analysis system which downloads and analyzes a source code of a website. This system is not susceptible to attacks because it is not attacked directly, but needs a person to analyze the source code or spends a long time for the analysis. As the number of the websites is increasing, it takes a very long time to analyze all the websites using the conventional analysis systems.

DISCLOSURE OF THE INVENTION

Therefore, the present invention has been made to solve the aforementioned problems in the prior art, and its object is to provide a detection system and method of a suspicious malicious website using the analysis of a JavaScript obfuscation strength which confirms the presence or absence of a malicious action by measuring an obfuscation strength of an obfuscated website using a density, a specific function frequency, a special character frequency, and an entropy value, based on the length of an obfuscated JavaScript character string present in the website, and by inspecting only features of the malicious action based on features of a malicious action code, without interpreting the obfuscated JavaScript.

According to an aspect of the present invention for achieving the above object, there is provided a detection system of a suspicious malicious website using the analysis of a JavaScript obfuscation strength, including: an entropy measuring block of measuring an entropy of an obfuscated JavaScript present in the website, a special character entropy, and a variable/function name entropy; a frequency measuring block of measuring a specific function frequency, an encoding mark frequency and a % symbol frequency of the JavaScript; a density measuring block of measuring the maximum length of a single character string of the JavaScript; and a malicious website confirming block of determining whether the relevant website is malicious by comparing an obfuscation strength value, measured by the entropy measuring block, the frequency measuring block and the density measuring block, with a threshold value.

In addition, the entropy measuring block may include: a first calculating unit of calculating a total entropy of the JavaScript; a second calculating unit of calculating a difference between the total entropy calculated by the first calculating unit and an average entropy; a third calculating unit of calculating the most frequent special character entropy of the JavaScript; a fourth calculating unit of calculating a special character entropy of a special character group of the JavaScript; a fifth calculating unit of calculating a special character entropy of the entire used character group of the JavaScript; a sixth calculating unit of calculating a difference between the special character entropy calculated by the fourth calculating unit and the special character entropy calculated by the fifth calculating unit; a seventh calculating unit of calculating a difference between the value obtained by the sixth calculating unit and a non-special character entropy; and an eighth calculating unit of calculating an average variable/function name entropy of the JavaScript.

Moreover, the frequency measuring block may include: a function frequency calculating unit of calculating a specific function use frequency of the JavaScript, such as eval, replace and fromCharCode; a mark frequency calculating unit of calculating an encoding mark use frequency of the JavaScript; a first symbol frequency calculating unit of calculating a % symbol use frequency inside an HTTP link of the JavaScript; and a second symbol frequency calculating unit of calculating a % symbol use frequency outside the HTTP link of the JavaScript.

Here, the density measuring block may detect a single character string containing at least 200 characters.

Additionally, the malicious website confirming block may include: a comparing unit of comparing the obfuscation strength, measured by the entropy measuring block, the frequency measuring block and the density measuring block, with the threshold value; and a determining unit of determining the relevant website as a malicious obfuscation website, if the obfuscation strength value is smaller than the threshold value as the result of the comparing unit.

According to another aspect of the present invention for achieving the above object, there is provided a detection method of a suspicious malicious website using the analysis of a JavaScript obfuscation strength, including: measuring, at an entropy measuring block, an entropy of an obfuscated JavaScript present in the website, a special character entropy, and a variable/function name entropy; measuring, at a frequency measuring block, a specific function frequency, an encoding mark frequency and a % symbol frequency of the JavaScript; measuring, at a density measuring block, the maximum length of a single character string of the JavaScript; and determining, at a malicious website confirming block, whether the relevant website is malicious by comparing an obfuscation strength value, measured by the entropy measuring block, the frequency measuring block and the density measuring block, with a threshold value.

Additionally, in the measuring of the entropy of the obfuscated JavaScript present in the website, the special character entropy and the variable/function name entropy, the entropy measuring block may calculate a total entropy of the JavaScript, a difference between the total entropy and an average entropy, the most frequent special character entropy of the JavaScript, a special character entropy of a special character group of the JavaScript, a special character entropy of the entire used character group of the JavaScript, a difference between the special character entropy and the special character entropy of the character group, a difference of a non-special character entropy, and an average variable/function name entropy of the JavaScript.

Further, in the measuring of the specific function frequency, the encoding mark frequency and the % symbol frequency of the JavaScript, the frequency measuring block may calculate a specific function use frequency of the JavaScript, such as eval, replace and fromCharCode, an encoding mark use frequency of the JavaScript, a % symbol use frequency inside an HTTP link of the JavaScript, and a % symbol use frequency outside the HTTP link of the JavaScript.

Furthermore, in the measuring of the maximum length of the single character string of the JavaScript, the density measuring block may detect a single character string having the maximum length of at least 200 characters.

Still furthermore, in the determining whether the relevant website is malicious by comparing the obfuscation strength value, measured by the entropy measuring block, the frequency measuring block and the density measuring block, with a threshold value, the malicious website confirming block may compare the obfuscation strength, measured by the entropy measuring block, the frequency measuring block and the density measuring block, with the threshold value and determine the relevant website as a malicious obfuscated website if the obfuscation strength value is smaller than the threshold value.

As described above, according to the present invention, in order to reduce the non-detection ratio of the website, the density is set as the primary obfuscation strength element, and the frequency/entropy results are designated as detailed obfuscation strength elements, so that different weights are given respectively to detailed inspection items based on the importance of obfuscation features and malicious action code features, and that the malicious obfuscation strength of the website is displayed based on the values measured in the inspection of the website. Then, a risk level of the relevant website is displayed in the further analysis, thereby reducing a time taken to detect the website.

In addition, according to the present invention, so as to overcome the disadvantage of the conventional dynamic website analysis system, the presence or absence of a malicious action is inspected by reading only the source of the website, which results in a short website inspection time.

Moreover, according to the present invention, during the conventional static website analysis time, the obfuscation and maliciousness can be confirmed by inspecting only the features of the web source code, which leads to the low probability of the non-detection and the mis-detection of the malicious obfuscated website.

BEST MODE FOR CARRYING OUT THE INVENTION

Figure 1:
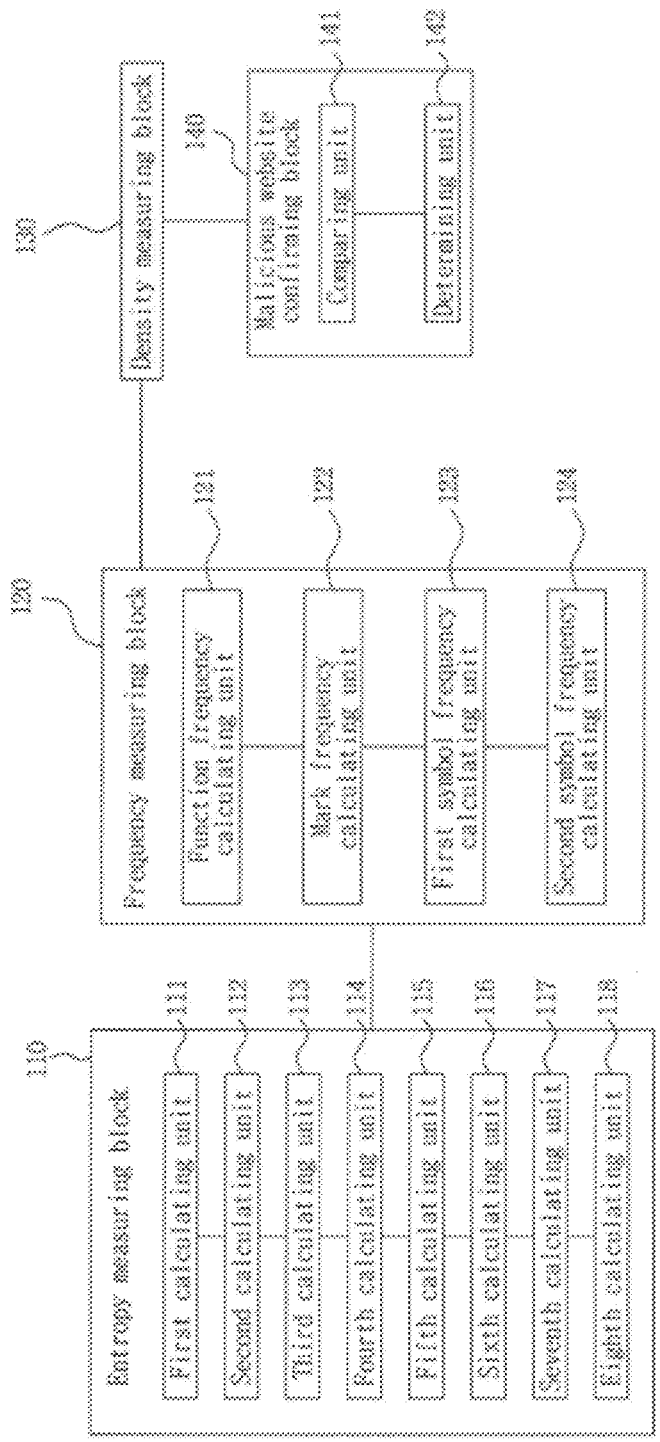
FIG. 1 is a block diagram of a detection system of a suspicious malicious website using the analysis of a JavaScript obfuscation strength according to an exemplary embodiment of the present invention.

Technical configuration and operational effects of a system and method for detecting a suspicious malicious Website using an analysis of JavaScript obfuscation strength according to embodiments of the present invention can be clearly understood according to the detailed description with reference to the accompanying drawings hereinbelow.

System for Detecting Suspicious Malicious Website Using an Analysis of JavaScript Obfuscation Strength With reference to FIGS. 1 to 8, a system 100 for detecting a suspicious malicious Website using an analysis of JavaScript obfuscation strength may include an entropy measuring block 110 of measuring an entropy of an obfuscated JavaScript present in the website, a special character entropy, and a variable/function name entropy, a frequency measuring block 120 of measuring a specific function frequency, an encoding mark frequency and a % symbol frequency of the JavaScript, a density measuring block 130 of measuring the maximum length of a single character string of the JavaScript, and a malicious website confirming block 140 of determining whether the corresponding website is malicious by comparing an obfuscation strength value, measured by the entropy measuring block 110, the frequency measuring block 120 and the density measuring block 130, with a threshold value.

The entropy measuring block 110 has a total of eight detailed inspection references based on an entropy of an obfuscated JavaScript present in a website, a special character entropy, and a variable/function name entropy. Here, the entropy measuring block 110 lays emphasis on the entropy of JavaScript present in the corresponding Website, rather than on an entropy of an entire Website source. Also, the entire entropy of JavaScript and a thing declared by <script **> and ended by </script> is defined as a Java block. Thus, An average entropy of the Java block is obtained by calculating the entropies of the respective Java blocks and dividing the total by the number of Java blocks, and the entire JavaScript entropy corresponds to an entropy calculated by setting a group of Java blocks as a single large group.

The entropy measuring block 110 may include a first calculating unit 111 of calculating a total entropy of the JavaScript, a second calculating unit 112 of calculating a difference between the total entropy calculated by the first calculating unit 111 and an average entropy, a third calculating unit 113 of calculating the most frequent special character entropy of the JavaScript, a fourth calculating unit 114 of calculating a special character entropy of a special character group of the JavaScript, a fifth calculating unit 115 of calculating a special character entropy of the entire used character group of the JavaScript, a sixth calculating unit 116 of calculating a difference between the special character entropy calculated by the fourth calculating unit 114 and the special character entropy calculated by the fifth calculating unit 115, a seventh calculating unit 117 of calculating a difference between the value obtained by the sixth calculating unit 116 and a non-special character entropy, and an eighth calculating unit 118 of calculating an average variable/function name entropy of the JavaScript.

Figure 2:
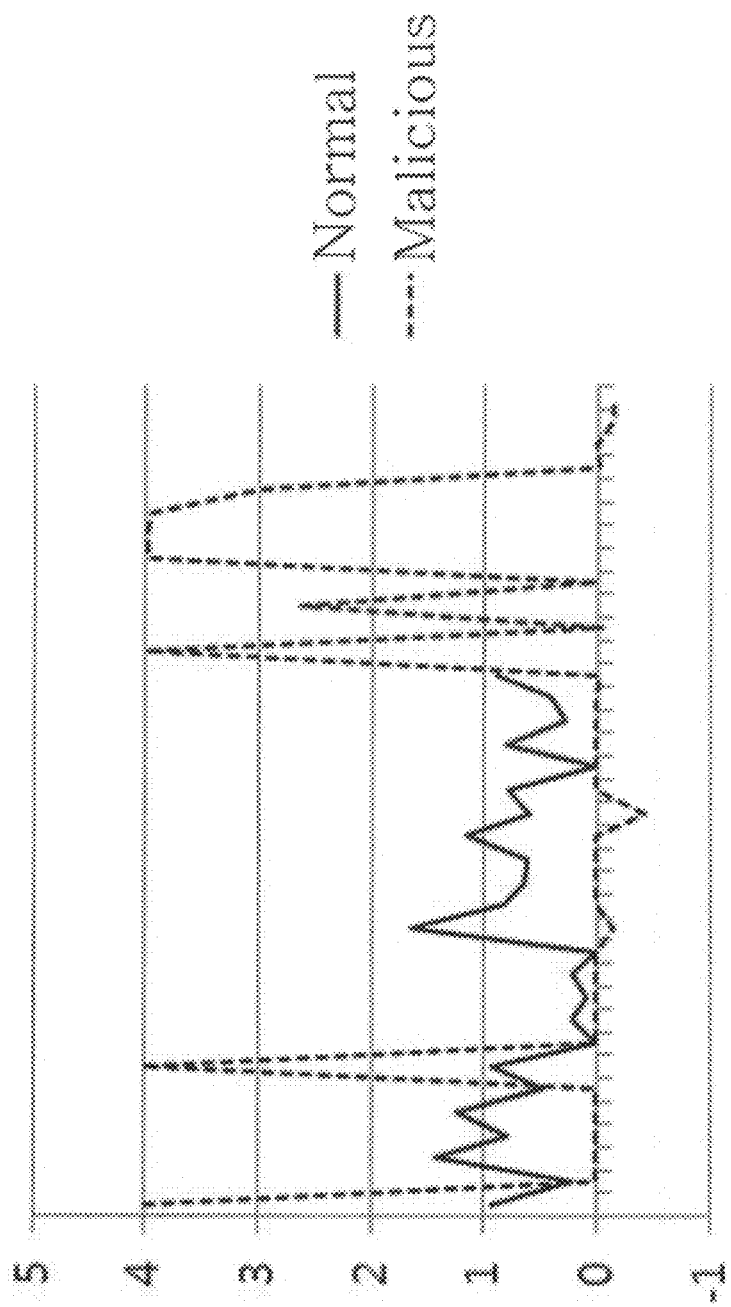
FIG. 2 is a graph showing a difference between an average JavaBlock entropy and a total JavaScript entropy employed in the detection system of the suspicious malicious website using the analysis of the JavaScript obfuscation strength according to the exemplary embodiment of the present invention.

In detail, the entropy measuring block 110 has two types of detailed inspection references by using the overall JavaScript entropy. This can be made by the first calculating unit 111 and the second calculating unit 112. Whether the JavaScript is obfuscated can be checked by using the result of a difference between a normal JavaScript entropy value and the obfuscated JavaScript entropy. Also, whether the JavaScript is obfuscated can be checked by using the difference between the overall JavaScript and an average Java block entropy. In general, as shown in FIG. 2, the overall JavaScript entropy value of the obfuscated JavaScript has a lower value than a normal JavaScript. Also, the difference of the average Java block entropy has a value smaller than 0 or a considerably large value than the values appearing in normal JavaScript.

Figure 3:
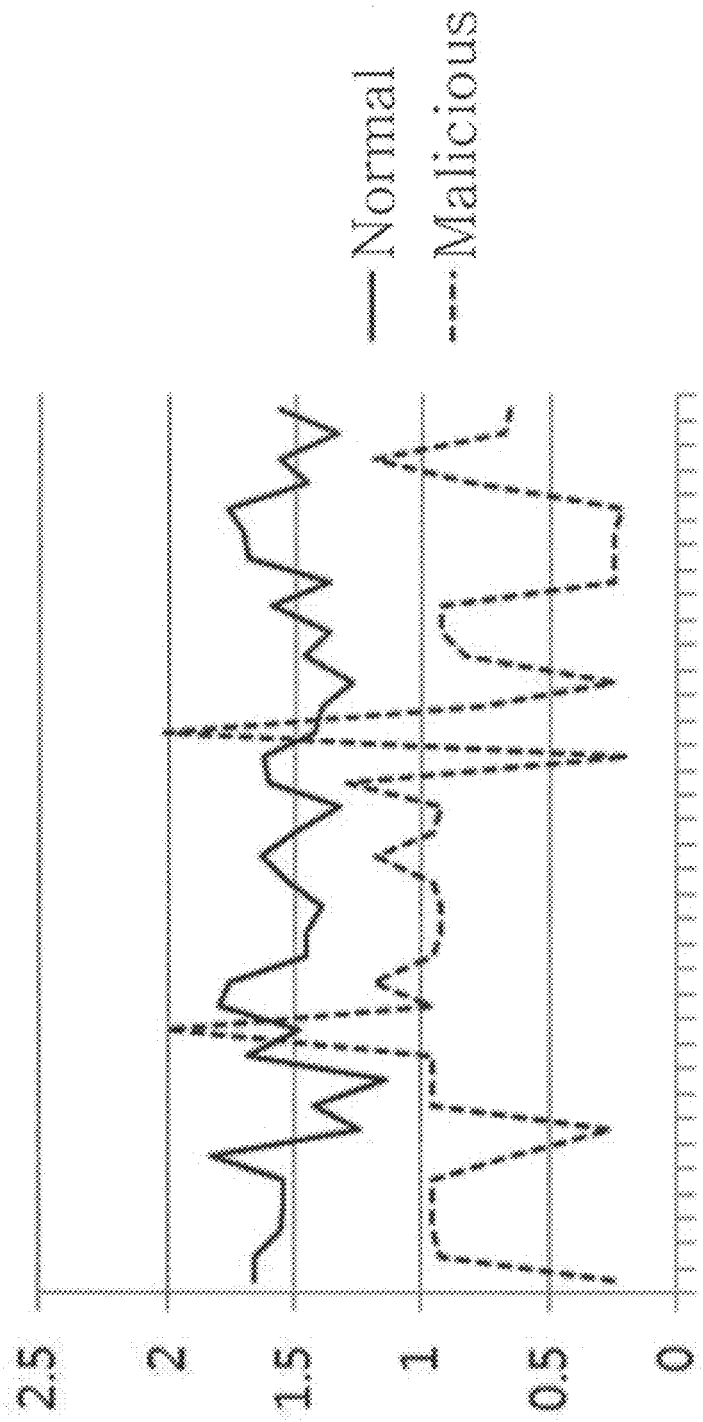
FIG. 3 is a graph showing a special character entropy of the entire group employed in the detection system of the suspicious malicious website using the analysis of the JavaScript obfuscation strength according to the exemplary embodiment of the present invention.
Figure 4:
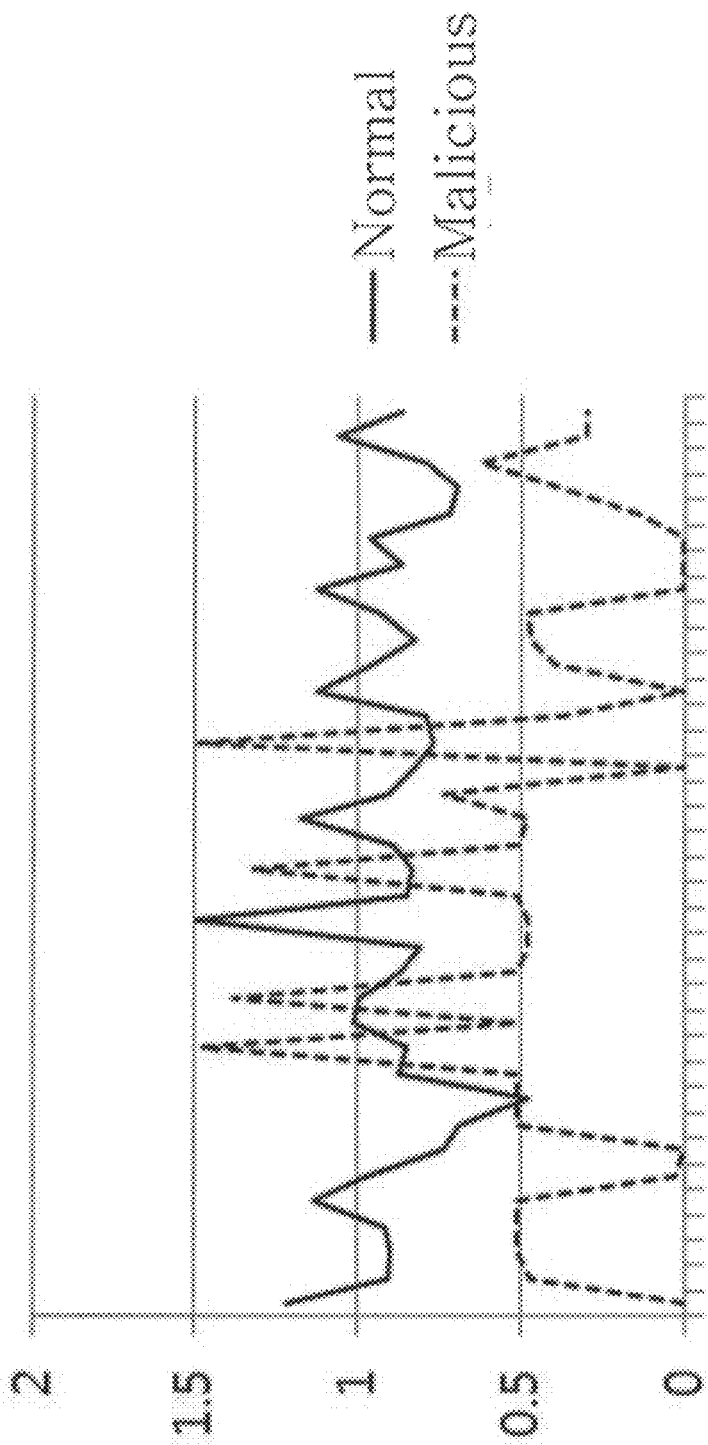
FIG. 4 is a graph showing a difference of a non-special character entropy employed in the detection system of the suspicious malicious website using the analysis of the JavaScript obfuscation strength according to the exemplary embodiment of the present invention.

The entropy measuring block 110 has five detailed inspection references by using a special character entropy. This can be made by the third calculating unit 113, the fourth calculating unit 114, the fifth calculating unit 115, the sixth calculating unit 116, and the seventh calculating unit 117. An entropy of a character which has been generated most frequently among special characteristics is obtained and set as a reference. A particular special character is greatly used in the obfuscated JavaScript. Thus, as shown in FIG. 3, the entropy value of the most used special character is larger than the normal entropy value. Based on the used special character, the entropy of the used special character, three references can be set by using an entropy of a special character based on a used special character, a special character entropy in a total character group used in JavaScript, and the difference between two calculated values. The special character entropy in the used entire character group has a lower value in obfuscated JavaScript than in normal JavaScript. Such characteristics increase the difference between the entropy in the used special character set and the entropy of the entire characters, and a obfuscated JavaScript has a high numerical value compared with normal JavaScript. The difference in general characters, rather than a special character, is obtained and set as another detailed inspection reference. In general, obfuscated JavaScript uses various characters, so it has a low value in a general character entropy difference value as a final inspection reference.

The entropy measuring block 110 sets an entropy using a parameterization function name as a final inspection reference. This can be made by the eighth calculation unit 118. In obfuscated JavaScript, variable name and function name may also be obfuscated. Thus, based on this characteristics, entropies of the respective variable names and function names are measured and the sum is averaged to calculate an entropy value. In normal JavaScript, a large number of characters are not used in function name or variable name and characters are repeatedly used. Thus, in general, normal JavaScript has a low entropy value.

The frequency measuring block 120 uses a specific function frequency, an encoding mark frequency and a % symbol frequency as detailed inspection items used to check frequency. One of major characteristics of obfuscated JavaScript is that obfuscated character strings includes a portion for normalizing the obfuscated character strings by using specific functions such as eval, replace, fromCharCode, or the like. Thus, in the present invention, the possibility of obfuscation is checked by recognizing frequency of such specific functions. In addition, since there is a method for releasing the obfuscation by using a dynamic generation, frequency of dynamic generation function such as document, write, document.create.Element, etc., can be also checked.

The frequency measuring block 120 may include a function frequency calculating unit 121 of calculating a specific function use frequency of the JavaScript, such as eval, replace and fromCharCode, a mark frequency calculating unit 122 of calculating an encoding mark use frequency of the JavaScript, a first symbol frequency calculating unit 123 of calculating a % symbol use frequency inside an HTTP link of the JavaScript, and a second symbol frequency calculating unit 124 of calculating a % symbol use frequency outside the HTTP link of the JavaScript.

Figure 5:
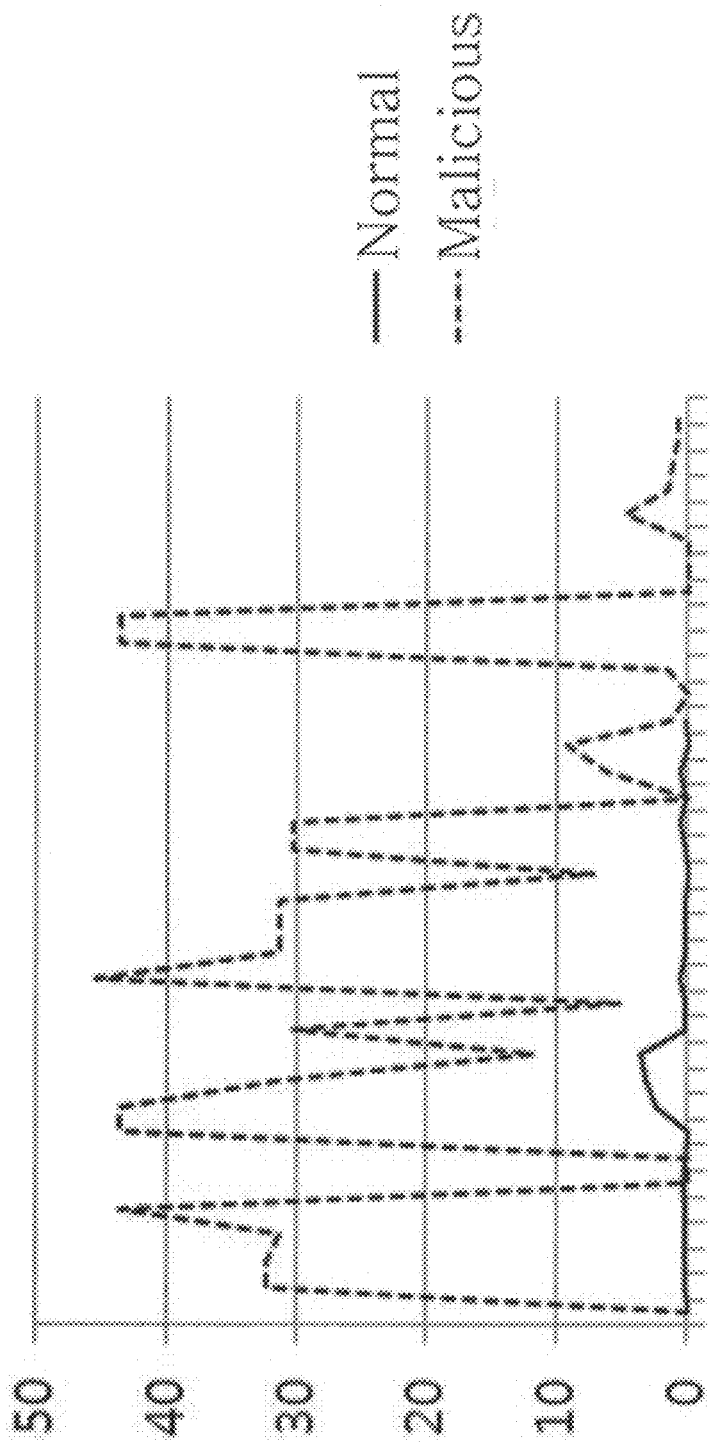
FIG. 5 is a graph showing a specific function use frequency employed in the detection system of the suspicious malicious website using the analysis of the JavaScript obfuscation strength according to the exemplary embodiment of the present invention.

In detail, in order to calculate a specific function frequency, the frequency measuring block 120 divide the total usage number of specific functions by a total number of character strings present in JavaScript. This can be performed by the function frequency calculating unit 121. If the total usage number of specific functions are divided by the total number of functions used in JavaScript, there is not much difference in frequency between normal JavaScript and obfuscated JavaScript. In particular, there is a method in which a character string is divided to be used, one of features of obfuscated JavaScript, or the length of a single character string is reduced and later coupled through + operation. In this case, the number of specific functions is increased, and when the frequency is specified by dividing the total number of used specific functions by the total number of used functions, the specific frequency has a significant difference in frequency from JavaScript having the same code expressed by a different number of specific functions. However, when the total usage number of specific functions is divided by the total number of character strings, since the increased number of character strings is greater than the increased number of specific functions or the number of character strings is already sufficiently large, the change in the specific function usage frequency is small. Thus, in order to inspect malicious obfuscated JavaScript, it is more effective to obtain frequency by using the number of used character strings rather than using the total number of functions. In general, as shown in FIG. 5, the obfuscated JavaScript has a higher value of the frequency of a specific function than normal JavaScript does.

The frequency measuring block 120 further includes an encoding mark frequency. This can be performed by the mark frequency calculating unit 122. One of features of a malicious action code is the use of ASCII characters, Unicode, number conversion, or the like to degrade readability. Thus, the fact that the frequency of the encoding mark is frequently used compared with normal JavaScript is used. The frequency is calculated by dividing the total usage number of encoding marks by the number of respective characters used in JavaScript. The malicious obfuscated JavaScript generally has a higher frequency than that of the normal case.

Figure 6:
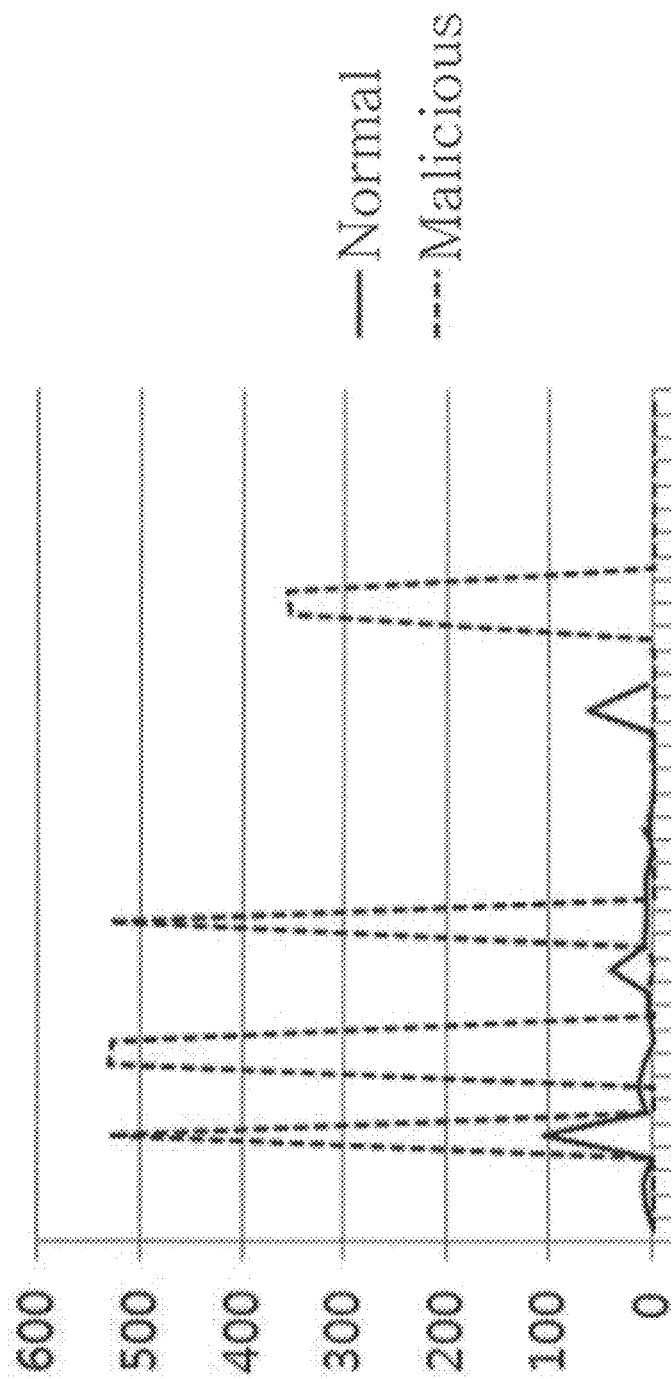
FIG. 6 is a graph showing the number of % symbols inside an HTTP link employed in the detection system of the suspicious malicious website using the analysis of the JavaScript obfuscation strength according to the exemplary embodiment of the present invention.
Figure 7:
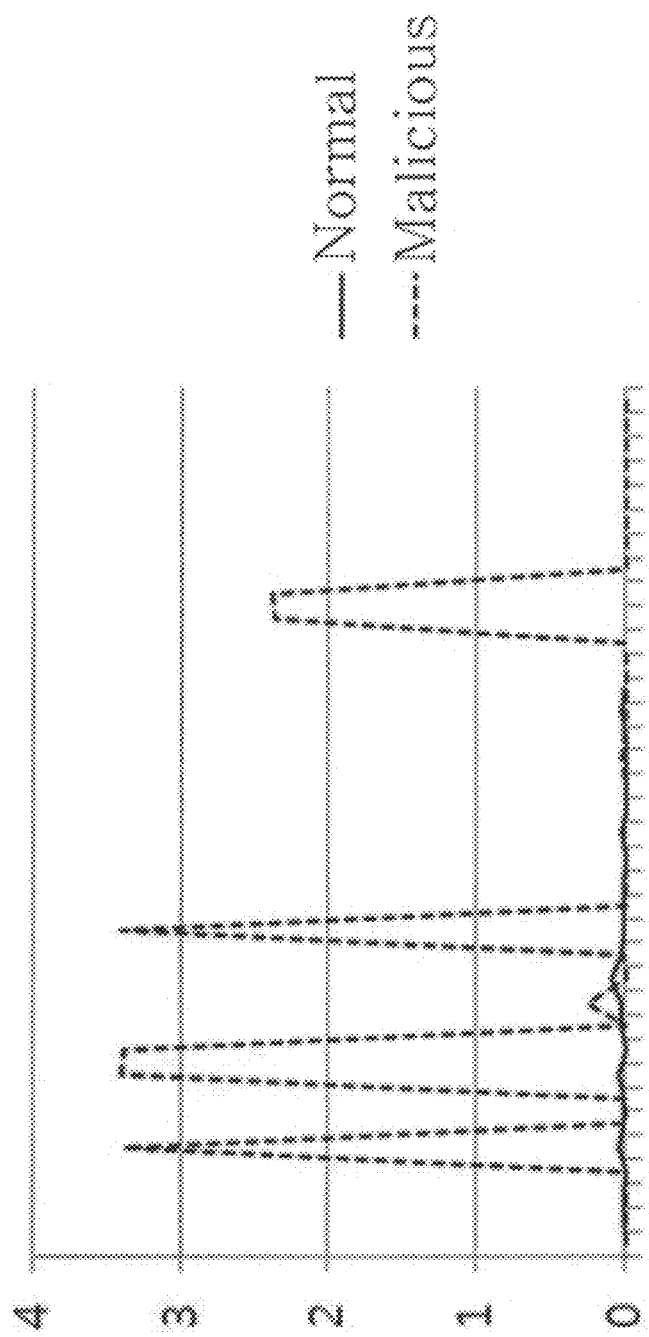
FIG. 7 is a graph showing the number of % symbols outside the HTTP link employed in the detection system of the suspicious malicious website using the analysis of the JavaScript obfuscation strength according to the exemplary embodiment of the present invention.

As shown in FIGS. 6 and 7, the frequency measuring block 120 calculates the encoding mark frequency by dividing the usage frequency of % symbol which is present within and outside an HTTP link. This can be performed by the first symbol frequency calculating unit 123 and the second symbol frequency calculating unit 124. In general, when URL encoding is performed, since %^ symbols are frequently used within the HTTP link, so the frequency can be checked based on % symbol present outside the HTTP link.

Figure 8:
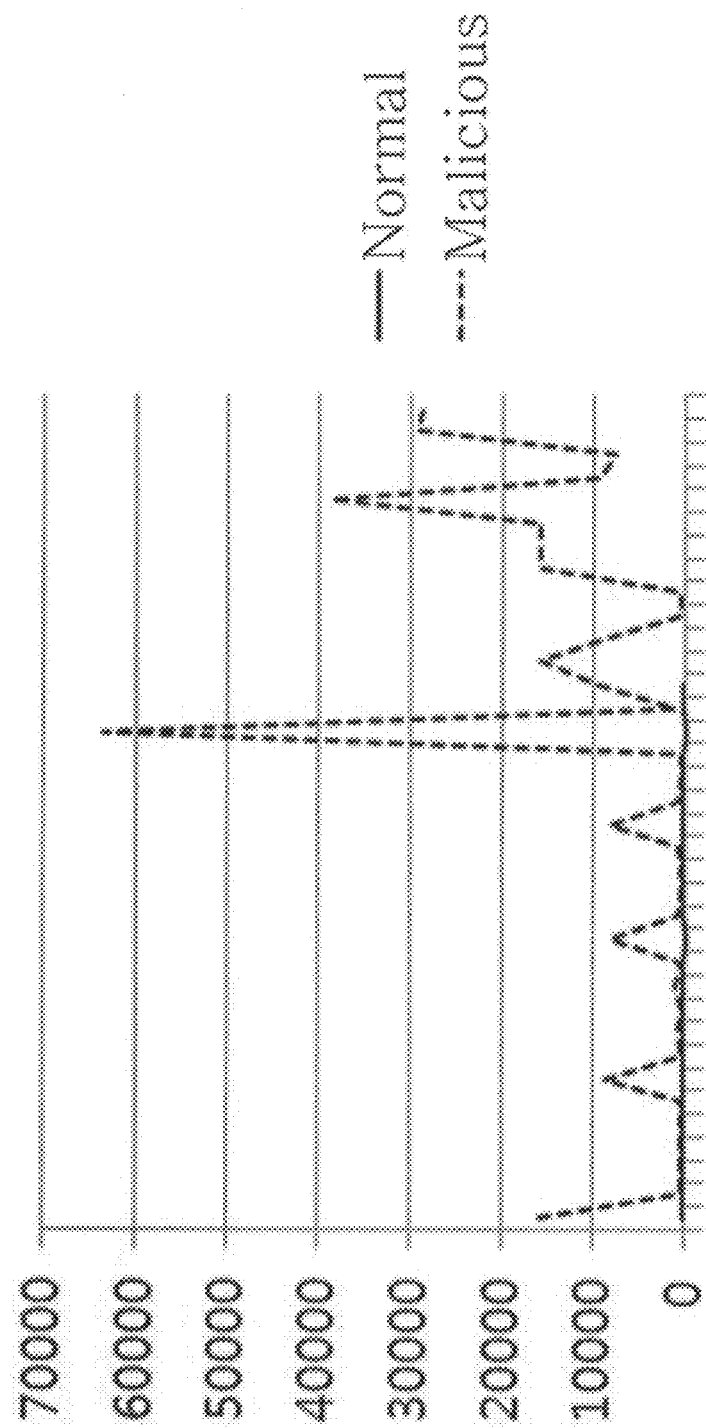
FIG. 8 is a graph showing the maximum length of a single character string employed in the detection system of the suspicious malicious website using the analysis of the JavaScript obfuscation strength according to the exemplary embodiment of the present invention.

As shown in FIG. 8, the density measuring block 130 selects density by the length of a single character string used in a Web source code. In general, the length of a character string after obfuscation is increased than an existing character string. The length of a corresponding character string is increased in the process of encoding the character string or replacing it with a meaningless character. Thus, the length of a single character string is measured based on the features, and when it has a size of 200 characters or greater, a corresponding Website may be determined as a malicious obfuscated Website. A single character string refers to a character string which is purely arranged and divided by special characters (<.>, ", ', [,], {,}, etc.), different from malicious obfuscated Website detection using a character string pattern. In the related art, one character string is set based on a blank character. In such a case, a normal character string such as a URL link, or the like, of a normal website is considered to be a malicious action character string. Thus, in order to prevent such an erroneous detection (or mis-detection), a stronger reference than the blank character is set. Also, in the related art, a reference for determining a malicious obfuscated website is presented based on 350 characters, but in the present invention, a single character string having 200 characters or greater is set as a detection reference in order to prevent an erroneous detection.

The malicious website confirming block 140 determines whether the corresponding website is malicious by comparing an obfuscation strength value, measured by the entropy measuring block 110, the frequency measuring block 120 and the density measuring block 130, with a threshold value.

The malicious website confirming block 140 may include a comparing unit 141 of comparing the obfuscation strength, measured by the entropy measuring block 110, the frequency measuring block 120 and the density measuring block 130, with the threshold value, and a determining unit 142 of determining the relevant website as a malicious obfuscation website, if the obfuscation strength value is smaller than the threshold value as the result of the comparing unit 141. Table 1 below shows a major detection values of the obfuscation strength inspection of the detections system 100 according to the present invention.

TABLE 1

| Evaluation item | Average | | Maximum value | | Minimum value | |
|---|---|---|---|---|---|---|
| | Normal | Obfuscation | Normal | Obfuscation | Normal | Obfuscation |
| Length of character string | 91.9167 | 10191.7 | 205 | 63363 | 23 | 367 |
| Special function frequency | 0.53299 | 18.1484 | 3.66 | 45.454 | 0 | 0 |
| Java entropy difference | 0.6144 | 0.82288 | 1.66098 | 4.01651 | 0 | −0.4246 |
| Entire Java entropy | 5.34948 | 4.89889 | 5.88991 | 6.06263 | 4.90447 | 2.24381 |
| Special character entropy (entire group) | 1.526274 | 0.84121 | 1.83064 | 2.00827 | 1.14211 | 0.1976 |
| Non-special character entropy difference | 0.91492 | 0.46986 | 1.49404 | 1.48538 | 0.47757 | 0.000267 |

Figure 9:
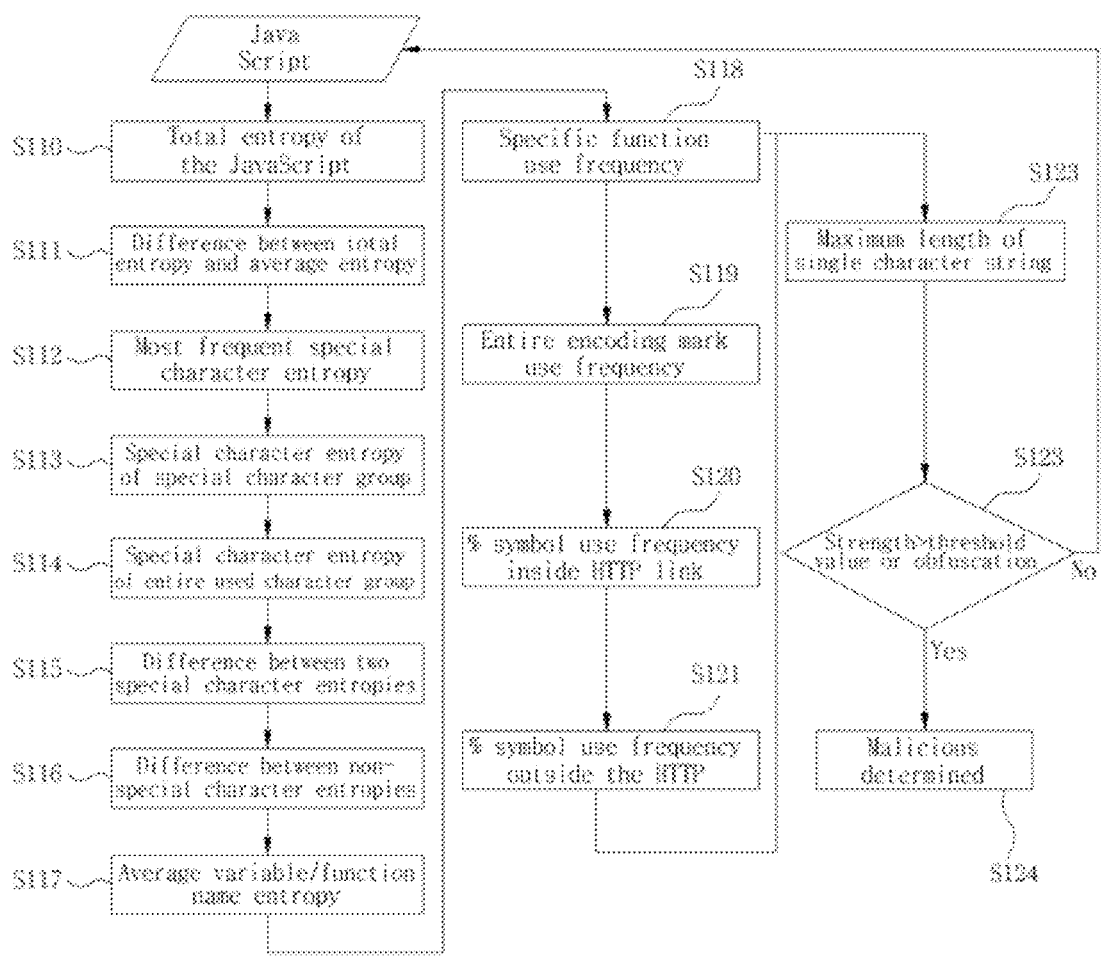
FIG. 9 is a flowchart of a detection method of a suspicious malicious website using the analysis of a JavaScript obfuscation strength according to an exemplary embodiment of the present invention.

Method for Detecting Suspicious Malicious Website Using Analysis of JavaScript Obfuscation Strength With reference to FIG. 9, the method for detecting a suspicious malicious website using an analysis of JavaScript obfuscation strength is based on the system 100 for detecting a suspicious malicious website using an analysis of JavaScript obfuscation strength having such a configuration as shown in FIG. 1 as described above, and a repeated description will be omitted.

First, the entropy measuring block 110 may measure the entropy of the obfuscated JavaScript present in the website, the special character entropy and the variable/function name entropy. Here, the entropy measuring block 110 may calculate a total entropy of the JavaScript (S110), a difference between the total entropy and an average entropy (S111), the most frequent special character entropy of the JavaScript (S112), a special character entropy of a special character group of the JavaScript (S113), a special character entropy of the entire used character group of the JavaScript (S114), a difference between the special character entropy and the special character entropy of the character group (S115), a difference of a non-special character entropy (S116), and an average variable/function name entropy of the JavaScript (S117).

The frequency measuring block 120 may measure the specific function frequency, the encoding mark frequency and the % symbol frequency of the JavaScript. Here, the frequency measuring block 120 may calculate a specific function use frequency of the JavaScript, such as eval, replace and fromCharCode (S118), an encoding mark use frequency of the JavaScript (S119), a % symbol use frequency inside an HTTP link of the JavaScript (S120), and a % symbol use frequency outside the HTTP link of the JavaScript (S121).

The density measuring unit 130 may measure the maximum length of the single character string of the JavaScript (S122). Here, the density measuring block 130 may detect a single character string having the maximum length of at least 200 characters.

The malicious website confirming block 140 may determine whether the relevant website is malicious by comparing the obfuscation strength value, measured by the entropy measuring block (S123, S124). Here, the frequency measuring block 140 and the density measuring block, with a threshold value, the malicious website confirming block may compare the obfuscation strength, measured by the entropy measuring block 110, the frequency measuring block 120 and the density measuring block 130, with the threshold value and determine the relevant website as a malicious obfuscated website if the obfuscation strength value is smaller than the threshold value.

As for the results obtained by comparing the detection system 100 provided in the present invention, Wepawet, Monkey Wrench, and Google, website targets as inspection targets were selected through malicious domain reporting sites, and normal websites as comparative targets were selected as inspection targets. The existing dynamic analysis systems 100 were compared based on the selected target websites. The present invention has a low non-detection rate compared with the other dynamic analysis systems 100 as shown in Table 2. Also, the present invention achieves a similar erroneous detection rate to that of the existing dynamic analysis system 100 while reducing required analysis time. This means that the method of the present invention can effectively collect suspicious malicious obfuscation websites as many as possible.

TABLE 2

|  | System 100 for detecting suspicious malicious website using analysis of JavaScript obfuscation strength | Wepawet | Monkey Wrench | Google |
| --- | --- | --- | --- | --- |
| Non-detection rate | 3.84% | 12.82% | 11.78% | 10.15% |
| Erroneous detection rate | 12.13% | 4.12% | 14.68% | 12.57% |
| Analysis failure (more than 2 seconds) | 0% | 7.85% | 19.89% | 21.68% |

In this manner, according to the present invention, in order to reduce the non-detection ratio of the website, the density is set as the primary obfuscation strength element, and the frequency/entropy results are designated as detailed obfuscation strength elements, so that different weights are given respectively to detailed inspection items based on the importance of obfuscation features and malicious action code features, and that the malicious obfuscation strength of the website is displayed based on the values measured in the inspection of the website. Then, a risk level of the relevant website is displayed in the further analysis, thereby reducing a time taken to detect the website. In addition, according to the present invention, during the conventional static website analysis time, the obfuscation and maliciousness can be confirmed by inspecting only the features of the web source code, which leads to the low probability of the non-detection and the mis-detection of the malicious obfuscated website.

The preferred embodiments of the present invention have been described with reference to the accompanying drawings, and it will be apparent to those skilled in the art that various modifications and variations can be made in the present invention without departing from the scope of the invention.

While the present invention has been shown and described in connection with the embodiments, it will be apparent to those skilled in the art that modifications and variations can be made without departing from the spirit and scope of the invention as defined by the appended claims.

What is claimed is:

1. A detection system of a suspicious malicious website using the analysis of a JavaScript obfuscation strength, comprising:
    an entropy measuring hardware processor of measuring an entropy of an obfuscated JavaScript present in the website, a special character entropy, and a variable/function name entropy;
    a frequency measuring hardware processor of measuring a specific function frequency, an encoding mark frequency and a % symbol frequency of the JavaScript;
    a density measuring hardware processor of measuring the maximum length of a single character string of the JavaScript; and
    a malicious website confirming hardware processor of determining whether the relevant website is malicious by comparing an obfuscation strength value, measured by the entropy measuring processor, the frequency measuring processor and the density measuring processor, with a threshold value,
    wherein the frequency measuring processor comprises:
    a function frequency calculating unit of calculating a specific function use frequency of the JavaScript, such as eval, replace and fromCharCode;
    a mark frequency calculating unit of calculating an encoding mark use frequency of the JavaScript;
    a first symbol frequency calculating unit of calculating a % symbol use frequency inside an HTTP link of the JavaScript; and
    a second symbol frequency calculating unit of calculating a % symbol use frequency outside the HTTP link of the JavaScript.

2. The detection system as claimed in claim 1, wherein the entropy measuring processor comprises:
    a first calculating unit of calculating a total entropy of the JavaScript;
    a second calculating unit of calculating a difference between the total entropy calculated by the first calculating unit and an average entropy;
    a third calculating unit of calculating the most frequent special character entropy of the JavaScript;
    a fourth calculating unit of calculating a special character entropy of a special character group of the JavaScript;
    a fifth calculating unit of calculating a special character entropy of the entire used character group of the JavaScript;
    a sixth calculating unit of calculating a difference between the special character entropy calculated by the fourth calculating unit and the special character entropy calculated by the fifth calculating unit;
a seventh calculating unit of calculating a difference between the value obtained by the sixth calculating unit and a non-special character entropy; and
an eighth calculating unit of calculating an average variable/function name entropy of the JavaScript.

3. The detection system as claimed in claim 1, wherein the density measuring processor detects a single character string containing at least 200 characters.

4. The detection system as claimed in claim 1, wherein the malicious website confirming processor comprises:
a comparing unit of comparing the obfuscation strength, measured by the entropy measuring processor, the frequency measuring processor and the density measuring processor, with the threshold value; and
a determining unit of determining the relevant website as a malicious obfuscation website, if the obfuscation strength value is smaller than the threshold value as the result of the comparing unit.

5. A detection method of a suspicious malicious website using the analysis of a JavaScript obfuscation strength, comprising:
measuring, at an entropy measuring processor, an entropy of an obfuscated JavaScript present in the website, a special character entropy, and a variable/function name entropy;
measuring, at a frequency measuring processor, a specific function frequency, an encoding mark frequency and a % symbol frequency of the JavaScript;
measuring, at a density measuring processor, the maximum length of a single character string of the JavaScript; and
determining, at a malicious website confirming processor, whether the relevant website is malicious by comparing an obfuscation strength value, measured by the entropy measuring processor, the frequency measuring processor and the density measuring processor, with a threshold value,
wherein, in the measuring of the specific function frequency, the encoding mark frequency and the % symbol frequency of the JavaScript,
the frequency measuring processor calculates a specific function use frequency of the JavaScript, such as eval, replace and fromCharCode, an encoding mark use frequency of the JavaScript, a % symbol use frequency inside an HTTP link of the JavaScript, and a % symbol use frequency outside the HTTP link of the JavaScript.

6. The detection method as claimed in claim 5, wherein, in the measuring of the entropy of the obfuscated JavaScript present in the website, the special character entropy and the variable/function name entropy,
the entropy measuring processor calculates a total entropy of the JavaScript, a difference between the total entropy and an average entropy, the most frequent special character entropy of the JavaScript, a special character entropy of a special character group of the JavaScript, a special character entropy of the entire used character group of the JavaScript, a difference between the special character entropy and the special character entropy of the character group, a difference of a non-special character entropy, and an average variable/function name entropy of the JavaScript.

7. The detection method as claimed in claim 5, wherein, in the measuring of the maximum length of the single character string of the JavaScript,
the density measuring processor detects a single character string having the maximum length of at least 200 characters.

8. The detection method as claimed in claim 5, wherein, in the determining whether the relevant website is malicious by comparing the obfuscation strength value, measured by the entropy measuring processor, the frequency measuring processor and the density measuring processor, with a threshold value,
the malicious website confirming processor compares the obfuscation strength, measured by the entropy measuring processor, the frequency measuring processor and the density measuring processor, with the threshold value and determines the relevant website as a malicious obfuscated website if the obfuscation strength value is smaller than the threshold value.

\* \* \* \* \*